United States Patent [19]
Collas et al.

[11] Patent Number: 5,504,295
[45] Date of Patent: Apr. 2, 1996

[54] ELECTRIC COOKING APPARATUS

[75] Inventors: Guy J. Collas, Ifs; Jean Lereverend, Caen, both of France

[73] Assignee: Moulinex S.A., Bagnolet, France

[21] Appl. No.: 217,756

[22] Filed: Mar. 25, 1994

[30] Foreign Application Priority Data

Mar. 30, 1993 [FR] France .................. 93 03693

[51] Int. Cl.⁶ .............................. H05B 3/68; F27D 11/00
[52] U.S. Cl. .................... 219/443; 219/432; 219/441; 219/442
[58] Field of Search ................... 219/432, 433, 219/434, 436, 438, 429, 435, 441, 442

[56] References Cited

U.S. PATENT DOCUMENTS

| | | |
|---|---|---|
| 2,769,878 | 11/1956 | Krichton . |
| 2,850,616 | 9/1958 | Hatch ............................ 219/433 |
| 2,851,576 | 9/1958 | Ripley . |
| 3,489,880 | 1/1970 | Bloomfield ..................... 219/436 |

FOREIGN PATENT DOCUMENTS

| | | |
|---|---|---|
| 377074 | 2/1985 | Austria . |
| 2624587 | 6/1989 | France . |
| 2443359 | 3/1976 | Germany . |
| 2917071 | 11/1980 | Germany . |
| 680185 | 7/1992 | Switzerland . |

*Primary Examiner*—Teresa J. Walberg
*Assistant Examiner*—Sam Paik
*Attorney, Agent, or Firm*—Young & Thompson

[57] ABSTRACT

Electric cooking apparatus having a base (1) in the shape of a frame with an open bottom, a removable pan (2) adapted to rest on the base, a cooking grille (3) for food disposed above the pan (2), and an electric heating resistance (4) disposed below the grille (3) on a support (5) and including a handle (6) adapted to rest in a recess (8) of the base (1). The handle (6) comprises a control switch (9) for the supply of electricity to the resistance (4) whose closing is subordinated, on the one hand, to the correct positioning of the handle (6) in the recess (8), and, on the other hand, to the actuation of an actuator or a transmitter (10) fixed to the base and adapted to detect the presence of the pan (2) on the base (1). The transmitter (10) is a member mounted movably on the base (1) whose one end (11) is adapted to come into contact with the pan (2) and whose other end (12) is adapted to control the switch (9).

9 Claims, 3 Drawing Sheets

ELECTRIC COOKING APPARATUS

FIELD OF THE INVENTION

The invention relates to electric cooking apparatus comprising a base in the form of a frame with an open bottom, a removable pan adapted to rest on said base, a cooking grille for foods placed above the pan, and an electric heating resistance disposed below the grille by means of a support and comprising a handle adapted to rest in a recess of the base.

BACKGROUND OF THE INVENTION

During use of such an apparatus, the user can place the heating resistance and the grille in correct position on the base without the pan having been mounted therein, and trigger the cooking operation. As a result, the working surface on which the apparatus rests can be damaged by heat radiated from the resistance and can even catch fire. With devices of this type, it can also happen that the heating resistance already turned on may be positioned directly in the pan, or on the working surface which can give rise to burning the user or the working surface.

SUMMARY OF THE INVENTION

The invention has for its object to remove these risks. In an apparatus according to the invention, the handle comprises a control switch for electrical supply of the resistance whose closing is subordinated, on the one hand, to the correct positioning of the handle in the recess, and, on the other hand, to the actuation of a an actuator or transmitter integral with the base and adapted to detect the presence of the pan on the base.

Thanks to these characteristics, it will be understood that to obtain operation of the apparatus, the presence of the base, and the pan, as well as the correct positioning of the handle on the base, will be necessary.

BRIEF DESCRIPTION OF THE DRAWINGS

The characteristics and advantages of the invention will become apparent from the description which follows, by way of non-limiting example, with reference to the accompanying drawings, in which.

DETAILED DESCRIPTION OF THE INVENTION

Figure 1:
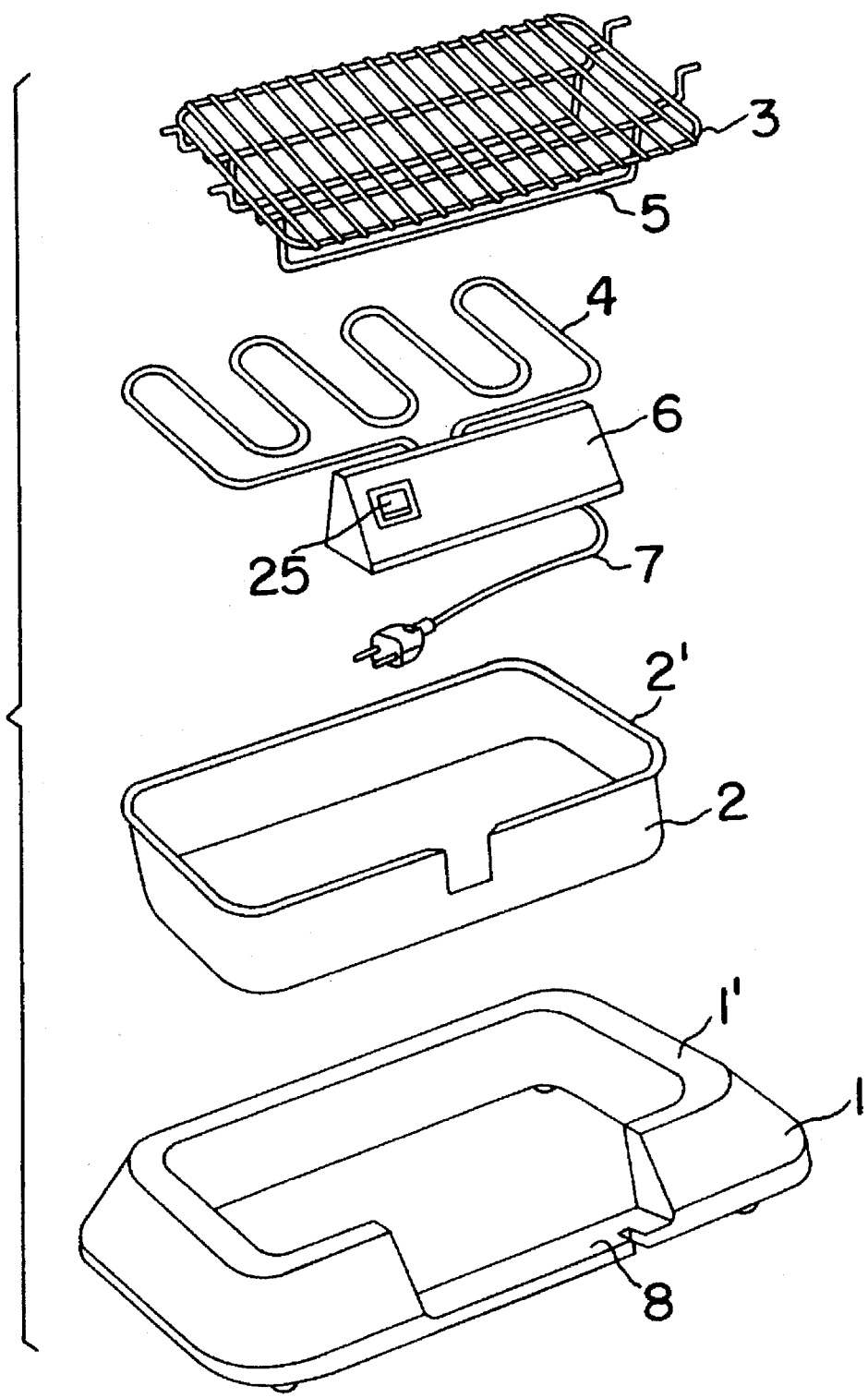
FIG. 1 is an exploded perspective view of a cooking apparatus showing the prior art.

The cooking apparatus shown in FIG. 1 is a grille of the horizontal type and comprises a base 1 having the shape of a frame with an open bottom, made of plastic material, a removable metal pan 2 adapted to rest by its margin 2' on the upper margin 1' of the base and adapted to contain water so as to avoid fumes occasioned by the collection of cooking fats, a cooking grille 3 for the food placed above the pan 2, as well as an electric heating resistance 4 of the shielded resistance type shaped along a sinuous path extending in one plane and maintained on the grille by a support 5 fixed to this grille 3. The ends of the resistance 4 are mounted in a control housing in the form of a hollow handle 6 of thermally insulating material and are connected to an electrical supply source by means of an electric cord 7. The handle 6 is adapted to rest in a recess 8 provided in a portion of the frame of the base 1 and has a shape complementary to said recess so as to occupy a particular position when seated.

Figure 2:
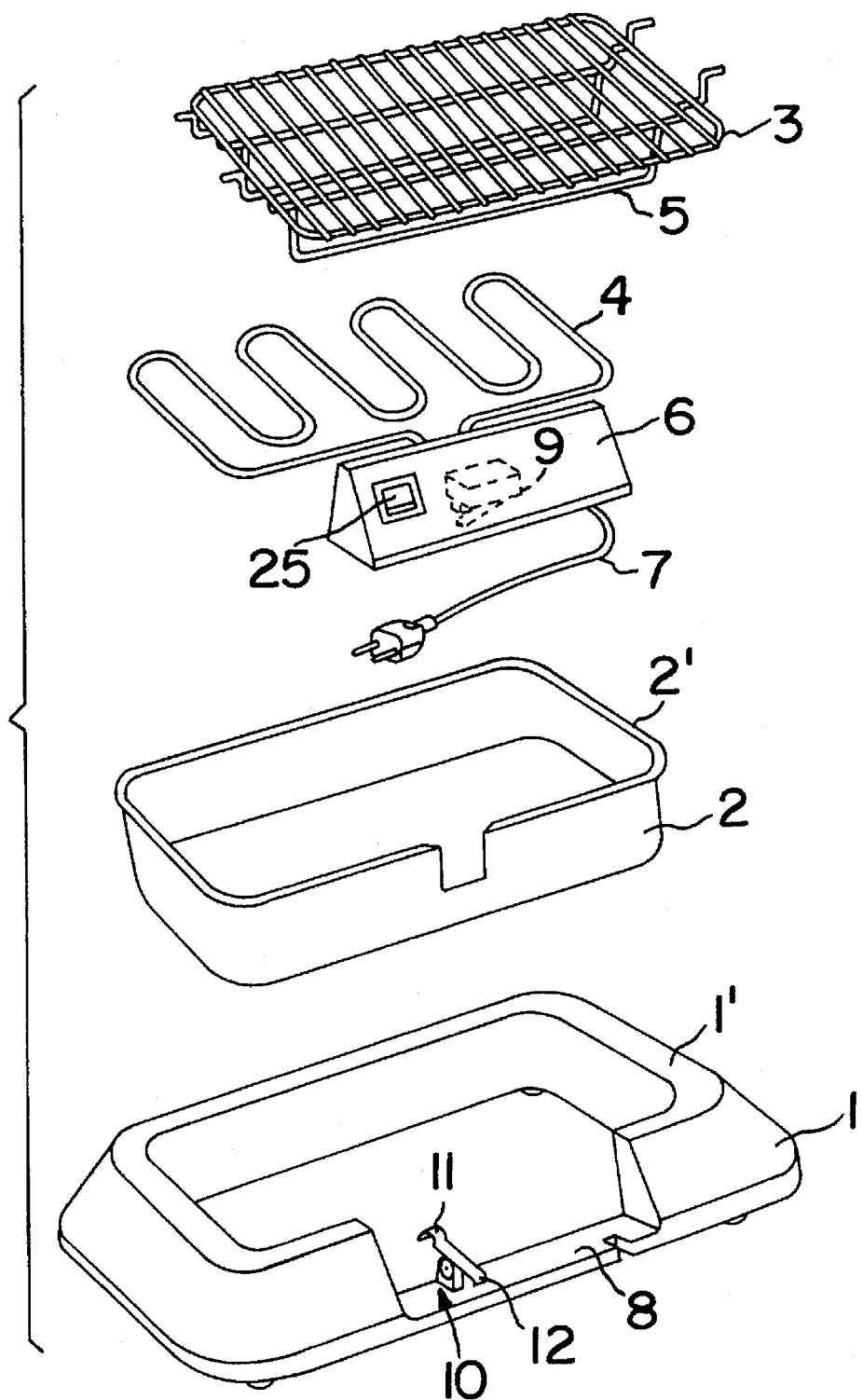
FIG. 2 is a view analogous to FIG. 1 in which a base and a resistant handle are provided with a transmitter and a switch according to the invention.

As shown in FIG. 2 and according to the invention, the handle 6 comprises a switch 9 for controlling the electrical supply of the resistance 4 whose closing is subordinated, on the one hand, to the correct positioning of the handle 6 in the recess 8, and, on the other hand, to the actuation of a transmitter 10 fixed to the base 1 and adapted to detect the presence of the pan 2 on the base 1.

Thus, thanks to this construction, there is obtained a safety device which prevents any improper operation of the apparatus because the switch 9 can be actuated only by the transmitter which is fixed to the base and whose actuation is itself subordinated to the presence of the pan 2 on the base 1.

The transmitter 10 is a member mounted movably on the base 1 and whose one end 11 is adapted to come into contact with the pan 2 and whose other end 12 is adapted to operate the switch 9.

Figure 3:
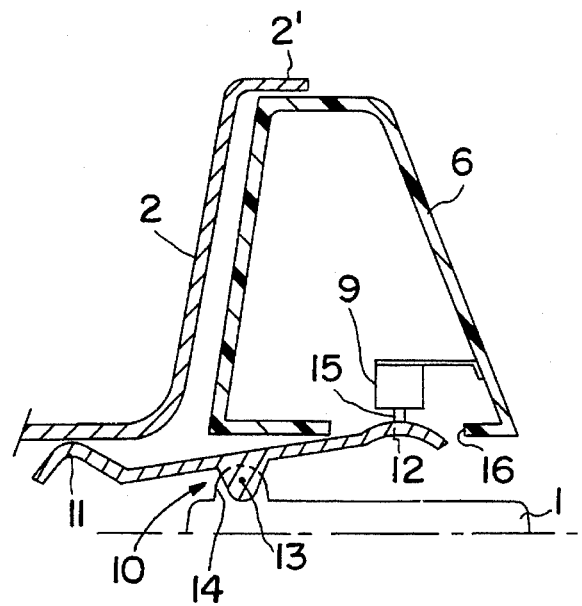
FIG. 3 is a fragmentary cross-sectional view on a larger scale illustrating the mounting of the base and of the resistant handle according to the invention in the presence of a pan which bears on the transmitter.

According to a preferred embodiment, and as is better seen in FIG. 3, the transmitter 10 is mounted pivotably about an axle 13 carried by a pivot 14 fixed to the base 1, while the switch 9 is of the microswitch type comprising a control button 15 which is disposed in the handle 6 facing an opening 16 provided in its lower wall and whose dimensions are such as to permit the passage of the end 12 so as to actuate the button 15 when the handle 6 is correctly positioned in its recess 8.

According to a modified embodiment not shown, the transmitter 10 is mounted substantially horizontally slidably in a guide fixed to the base and its end turned toward the interior of the base 1 has a sliding surface, rounded or sloped, so as to facilitate its operation during introduction of the pan 2 onto the base 1, while the handle 6 has an opening provided in its vertical wall turned toward the interior of the base, the control button of the switch being disposed facing this opening.

According to another embodiment not shown, there can be provided, instead of a microswitch with a control button, a switch of the ILS type controlled by a magnet carried by an end of the transmitter. Thanks to this switch, it is no longer necessary to provide openings in the handle and hence the handle is rendered fluid-tight for cleanliness.

For additional safety and according to another characteristic of the invention, the handle 6 comprises, in addition to a transmitter 10, a temperature detector 17 which is influenced by a movable feeler 18 fixed to the base 1 and adapted to come into contact with the pan when it is inserted in the base 1.

Figure 4:
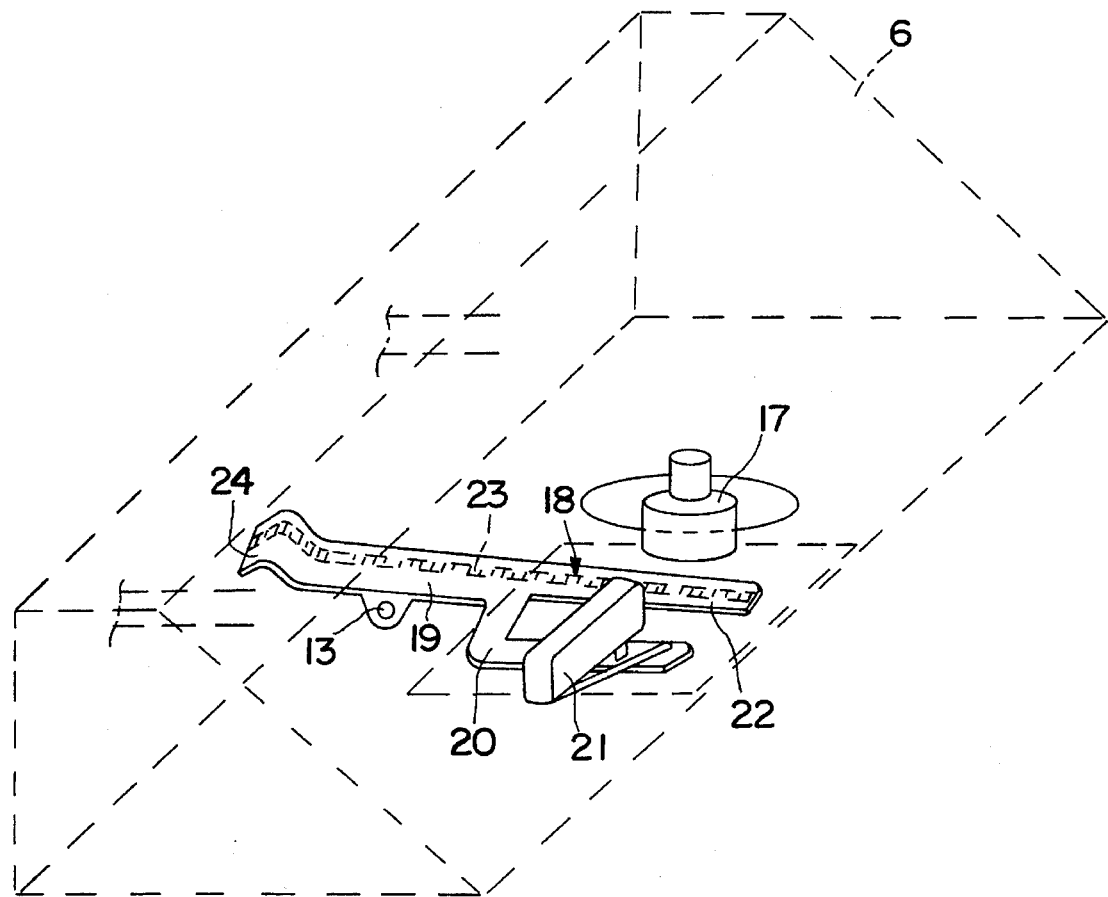
FIG. 4 is an enlarged broken-away perspective view of a modified embodiment of a temperature-detecting transmitter adapted to actuate a switch and a thermostat.

So as to obtain an economical construction and as shown in FIG. 4, this movable feeler 18 is associated with a movable metallic transmitter 19, for example of aluminum, which is pivotably mounted at 13 and which comprises a forked end of which one branch 20 is adapted to constitute by its end the actuator of a switch 21, and whose other branch 22 is adapted to come into contact with the detector 17 which, in this example, is the head of a resettable thermostat.

In another embodiment, and as shown in broken line in FIG. 4, the transmitter is of a molded plastic material resistant to heat and the feeler is a metallic strip 23 conductive to heat, molded in the plastic material and extending from the end 22 to the free end 24 which comes into contact with the pan 2.

The operation of the apparatus will now be described with respect to FIGS. 2 and 3 and it will be supposed that the apparatus shown disassembled will be subjected to, for example, washing after cooking.

The user inserts the pan 2 into the base 1 until its margin 2' rests on the upper margin 1' of the base. In the course of this movement, the bottom of the pan 2 acts on the end 11 of transmitter 10 which causes it to pivot about axle 13 so as to bring the end 12 into raised position. Then the user, after having secured the heating resistance 4 on the grille 3, introduces from above the assembly thus formed so as to obtain a correct positioning of the handle 6 in its recess 8, as well as the resting of the grille 3 on the edges of the pan 2. It will be understood that when the handle 6 descends into its recess, the end 12 enters the opening 16 and actuates the button 15 of the microswitch 9 thus permitting the electrical supply of the resistance. Of course, this handle can be provided with a stop-start switch 25 mounted in series with the microswitch 9 so as to be able better to control the cooking operations without manipulating the handle.

Thanks to this safety device constituted by the switch 9 and the transmitter 10, there is obtained a cooking apparatus which is reliable and responsive to safety standards in force or to be in force because the operation of the heating resistance 4 can be achieved only in the presence of the pan 2 and the correct positioning of the handle 6 in the base 1. Moreover, as soon as the user raises or removes the grille-resistance assembly by means of the handle 6, the push button 15 of the microswitch 21 is freed from the end 12 of the transmitter 10 and cuts off the supply to the resistance.

In the case in which the manufacturer wishes also to offer a thermal safety device, it suffices to replace the transmitter 10 by a transmitter 19 as in FIG. 4. Thus, if the user forgets to put water in the pan 2, the temperature of the wall of the pan will rise abnormally and will be transmitted by conduction to the end 24 in contact with the pan 2; then, either by the transmitter itself which is made of metal, or by the conductive strip 23, heat is conducted to the temperature detector 17 which thus cuts the electrical supply of the resistance thereby avoiding the formation of large quantities of smoke due to the flow of fat and even the risk of fire from the fat collected in the pan 2.

What is claimed is:

1. In an electric cooking apparatus comprising a base (1) in the shape of a frame with an open bottom, a removable pan (2) adapted to rest on said base, a cooking grille (3) for food disposed above the pan (2), and an electric heating resistance (4) disposed below the grille (3) by means of a support (5) and comprising a handle (6) having a housing capable of being held in a user's hand and adapted to rest in a recess (8) of the base (1); the improvement wherein the handle (6) comprises a control switch (9) for the supply of electricity to the resistance (4) and means for closing said switch (9) responsive both to the correct positioning of the handle (6) in the recess (8), and to the actuation of an actuator (10) mounted on said base and adapted to detect the presence of the pan (2) on the base (1).

2. Electrical cooking apparatus according to claim 1, wherein the actuator (10) is a member mounted movably on the base (1) whose one end (11) is adapted to come into contact with the pan (2) and whose other end (12) is adapted to control the switch (9).

3. Electrical cooking apparatus according to claim 2, wherein the actuator (10) is mounted pivotably about an axle (13) on the base (1).

4. Electrical cooking apparatus according to claim 2, wherein the actuator (10) is mounted slidably in a guide fixed to the base (1).

5. Electrical cooking apparatus according to claim 2, wherein the base (1) has the shape of a frame with an open bottom of which a part has a recess (8) which comprises the actuator (10), while the handle (6) has a shape complementary to that of the recess and comprises an opening (16) adapted to permit the passage of the end (12) of the actuator (10) so as to actuate the switch (9) mounted in the handle (6).

6. Electrical cooking apparatus according to claim 1, wherein the handle (6) comprises a temperature detector (17) which is influenced by a movable feeler (18) mounted on the base (1) and adapted to come into contact with the pan (2) when the pan is on the base (1).

7. Electrical cooking apparatus according to claim 6, wherein the feeler (18) has a movable actuator (19) for detection of the presence of the pan (2).

8. Electrical cooking apparatus according to claim 7, wherein the actuator is of one-piece metallic construction and comprises a forked end whose one branch (20) is adapted to control a switch (9-21), and whose other branch (22) is adapted to come into contact with the detector (17).

9. Electrical cooking apparatus according to claim 7, wherein the actuator is of a molded plastic material resistant to heat and the feeler is comprised by a metallic strip (23) conductive of heat and adapted to transmit the temperature of the pan to the detector (17).

* * * * *